(12) United States Patent
Suzuki

(10) Patent No.: US 6,621,049 B2
(45) Date of Patent: Sep. 16, 2003

(54) WELDING STABILITY ASSESSMENT APPARATUS FOR PULSED ARC WELDING

(75) Inventor: Yukimitsu Suzuki, Anjo (JP)

(73) Assignee: Central Motor Wheel Co., Ltd., Aichi-Ken (JP)

( * ) Notice: Subject to any disclaimer, the term of this patent is extended or adjusted under 35 U.S.C. 154(b) by 0 days.

(21) Appl. No.: 10/134,304

(22) Filed: Apr. 25, 2002

(65) Prior Publication Data

US 2002/0170899 A1 Nov. 21, 2002

(30) Foreign Application Priority Data

Apr. 26, 2001 (JP) .................................. 2001-129551
Apr. 26, 2001 (JP) .................................. 2001-129574

(51) Int. Cl.[7] .............................................. B23K 9/09
(52) U.S. Cl. ........................... 219/130.01; 219/130.51
(58) Field of Search ..................... 219/130.01, 130.21, 219/130.31, 130.32, 130.33, 130.51

(56) References Cited

U.S. PATENT DOCUMENTS

| | | | | |
|---|---|---|---|---|
| 5,221,825 A | * | 6/1993 | Siewert et al. ......... | 219/130.01 |
| 5,521,354 A | * | 5/1996 | Ludewig et al. ........ | 219/130.01 |
| 5,750,957 A | * | 5/1998 | Kilty et al. ............ | 219/130.21 |
| 5,756,967 A | * | 5/1998 | Quinn et al. ........... | 219/130.01 |
| 6,236,017 B1 | * | 5/2001 | Smartt et al. .......... | 219/130.01 |
| 6,441,342 B1 | * | 8/2002 | Hsu ....................... | 219/130.01 |

FOREIGN PATENT DOCUMENTS

| | | | |
|---|---|---|---|
| JP | 10-314940 | * | 12/1998 |
| JP | 11-123546 | * | 5/1999 |
| JP | 11-123547 | * | 5/1999 |

* cited by examiner

Primary Examiner—Clifford C. Shaw
(74) Attorney, Agent, or Firm—J.C. Patents

(57) ABSTRACT

The present invention relates to an apparatus for assessing start-of-weld and steady state welding stability in pulsed arc consumable electrode gas-shielded welding. According to the present welding stability assessment apparatus, in order to obtain a pass/fail decision on start-of-weld welding stability for pulsed arc welding, an irregularity value is computed by a computer means, based on detected values from a detector means; and a pass/fail decision is made by an assessment means, thus making it possible to perform accurate assessment of start-of-weld welding stability in pulsed-arc welding.

10 Claims, 11 Drawing Sheets

WELDING STABILITY ASSESSMENT APPARATUS FOR PULSED ARC WELDING

DETAILED DESCRIPTION OF THE INVENTION

The present invention is related to an apparatus for assessing start-of-weld and steady state welding stability in pulsed arc consumable electrode gas-shielded welding.

BACKGROUND ART

In consumable electrode gas-shielded welding using the pulsed arc method, as shown in FIG. 8, a pulsed current having a set periodic cycle is caused to flow in a welding wire, and the heat input of the arc formed between the welding wire and the workpiece melts the tip of the wire. A magnetic pinch force created by the pulse current squeezes out droplets of the molten metal and separates them from the tip of the wire, to be droplet-transferred to the weld site. In a stable welding state under optimum welding conditions, the welding is performed in a one-drop-per-pulse droplet-transfer mode.

This one-drop-per-pulse droplet-transfer pulsed arc welding has been made possible by recent on-going progress in welding inverter/power supply technology in the areas of precision feedback control of output voltage, and high-speed control of output current, the goal being to achieve reduced spatter, improved standards-based welding state repeatability, and higher welding speed.

[In spite of these improvements,] however, a stable arc could not be obtained at the start of a weld, because the welding wire suddenly brought into contact with the workpiece had not yet been heated, and was cold. Because of this, the welding operation at this stage was vulnerable to a variety of weld fault phenomena that cause major problems for automated production lines using welding robots, etc.

One example of such a start-of-weld fault phenomenon is the 'wire stick' phenomenon. This problem occurs when there is no momentary insulation breakdown as the welding wire (to which a high voltage is applied) is short-circuited to the workpiece, and thus no arc discharge occurs. This can be caused by poor grounding of the workpiece (which is part of the arc discharge circuit), a faulty welding wire power source, or the formation of an oxide ball on the tip of the welding wire. When a wire stick incident occurs, although the welding wire continues to be fed out and short circuit current continues to flow, no bead is formed, because there is no arc. This creates a discontinuity in the bead for the duration of the wire stick incident, thus causing a weld defect at the start of the weld.

Another start-of-weld fault phenomenon is arc interruption. In the arc interruption phenomenon, when a long duration short (such as a wire stick) occurs at the start of a weld, a very large short circuit current is drawn to release the short. This can cause a large amount of spattering when the arc is reestablished, and/or can cause the welding wire to be blown away. In either case, the arc is momentarily interrupted. The duration of a momentary arc interruption is referred to as 'arc interruption time.' Arc interruption prevents a proper arc from being formed, which in turn prevents the weld bead from being formed. This results in a discontinuity in the bead for the duration of the arc interruption time, causing a weld defect near the start of the weld.

Actions that can be taken to suppress such fault phenomena include (1) periodically cleaning the welding wire feed path, (2) periodically replacing the welding wire conduit cable, (3) periodically replacing the contact tip, or (4) taking the above actions after welding defects occur. The problem with this approach, however, is that because weld fault phenomena tend to be abated within a brief period after the start of the weld, once the weld is completed it can be very difficult, using visual inspection, to make pass/fail decisions for minor abnormalities. For this reason, in the past there tended to be differences in decisions made by individual inspectors, which made it hard to develop uniform in-line defect assessment standards.

In Japanese Laid-open Patent Bulletin No. H11-123546, the applicant in the present case proposed a method for assessing start-of-weld welding stability in consumable electrode 'short circuit' arc welding, a technique that differs from the pulsed arc consumable electrode gas-shielded welding described above. Because the droplet-transfer mode of this short circuit arc welding method is completely different from that in pulsed arc welding, however, the technology disclosed in the above bulletin cannot not be applied as-is for assessment of start-of-weld welding stability in the pulsed arc welding method. That is, in short circuit arc welding, as shown in FIG. 7, the tip of the consumable electrode (hereinafter 'welding wire') is melted by the heat input of the arc. A high density current produces a magnetic pinch force that separates molten metal from the tip of the welding wire in droplet form, and short-circuit-transfers it to the workpiece in the droplet 'contact transfer' state of the short circuit welding phenomenon. The weld current waveform at the start of the weld is basically astable and aperiodic. Therefore the process of extracting indexes indicative of the above fault phenomena from this waveform would be matter of isolating and extracting fault phenomena-related unstable waveform portions of a waveform that is itself unstable. It was clear that this would be extremely difficult to do. Therefore, for the short circuit arc welding method, rather than extracting fault phenomena indexes as had been done in the past, more importance was placed on extracting, from the above astable, aperiodic welding current waveform, indexes that were related to arc phenomena stability.

Therefore, even though the phenomena that appear when weld defects occur are the same in both welding methods, the drop transfer states, as described above, are completely different, and the processes that lead to defects are therefore also different. Accordingly, it was determined that no common index existed that could be used in both of these welding techniques to assess weld stability at the start of a weld.

Moreover, if one were to attempt to use the start-of-weld welding stability assessment method for short circuit arc welding described in Japanese Laid-open Patent Bulletin No. H11-123546 to perform the same assessment in pulsed arc welding, quantitative detection of instantaneous arc stability phenomena from the periodic pulse waveform would be too difficult to enable an accurate assessment to be performed.

As described above, then, the start-of-weld welding stability assessment method used for short circuit arc welding could not be used to perform a similar assessment for pulsed arc welding. Therefore, for fully automatic welding lines using arc welding robots, etc., as well as for semi-automatic welding lines, the prevention of welding quality defects caused by instability of start-of-weld welding phenomena was still a major problem.

The present invention was devised with the above problem in mind, and it is therefore a first object thereof to provide an assessment apparatus for making quick and accurate pass/fail assessments of welding stability for pulsed arc welding by quantitatively and accurately evaluating start-of-weld welding instability phenomena that occur in consumable electrode pulsed arc welding.

To achieve the above object, a welding stability assessment apparatus for pulsed arc welding according to claim 1 of the present invention is characterized in that, in consumable electrode gas-shielded pulsed-arc welding, wherein a welding voltage is applied between a welding electrode and a workpiece to be welded, for repeatedly supplying a pulse current and a base current, in alternation, and wherein welding is effected by causing a droplet from the welding electrode to be dropped onto the workpiece for each pulse, it comprises:

- a detector means for detecting at least one of
  - welding voltage between the welding electrode and the workpiece,
  - welding current flowing between the welding electrode and the workpiece, and
  - power-on time;
- a computer means for computing degree of irregularity in values detected by the detector means; and
- an assessment means for comparing the computed irregularity with the irregularity of a known-good pulsed arc at the start of welding, and, from the amount of separation therebetween, assessing the pulsed arc welding stability at the start of welding.

According to the above welding stability assessment apparatus, in order to obtain a pass/fail decision on start-of-weld welding stability for pulsed arc welding, an irregularity value is computed by a computer means, based on detected values from a detector means; and a pass/fail decision is made by an assessment means, thus making it possible to perform accurate assessment of start-of-weld welding stability in pulsed-arc welding.

Also, a welding stability assessment apparatus for pulsed-arc welding according to claim 2 of the present invention is characterized in that the computer means computes irregularity as the product of the standard deviations of the integrals of the pulse current and base current over each pulse code.

According to the above welding stability assessment apparatus, the product of the standard deviations of the integrals of the pulse current and base current for each pulse is used as an index of welding stability at start-of-weld in pulsed arc welding. This index simultaneously evaluates both pulse-current/base-current uniformity and pulse-time/base-time uniformity. Smaller index values are indicative of greater stability of the drop-transfer phenomenon at start-of-weld in pulsed arc welding.

Also, a welding stability assessment apparatus for pulsed-arc welding according to claim 3 of the present invention is characterized in that the computer means computes irregularity as the product of the standard deviation of the pulse period power-on time and base period power-on time.

According to the above welding stability assessment apparatus, the product of the standard deviations of the pulse period power-on time and base period power-on time for each pulse cycle is used as the index of welding stability at start-of-weld in pulsed arc welding. This index provides an even more precise evaluation of pulse time/base time uniformity. As in the above case, a lower value index indicates greater stability of the start-of-weld drop-transfer phenomenon in pulsed arc welding.

Also, a welding stability assessment apparatus for pulsed welding according to claim 4 of the present invention is characterized in that the computer means computes irregularity as the ratio between the standard deviation of the integral of the pulse current for each pulse cycle and the standard deviation of the integral of the pulse current for a known good weld.

According to the above welding stability assessment apparatus, the ratio between the standard deviation of the integral of the pulse current for each pulse cycle and the standard deviation of the integral of the pulse current for a known good weld is used as the index of welding stability at start-of-weld in pulsed arc welding. This index compares the drop-transfer state of the present weld with the optimum drop-transfer state to evaluate the amount of departure of the present state from the optimum state. A smaller index value indicates better drop transfer of the droplets at start-of-weld in pulsed arc welding.

As discussed above, the three different indexes used in the invention according to claims 2, 3, and 4 are important indicators for assessment of welding stability at start-of-weld in pulsed arc welding. Therefore, it is preferred that welding stability pass/fail decisions be made by computing all three indexes and comparing each index against a standard value. Depending on the situation, however, welding stability pass/fail decisions may instead be made by computing only one or two of the above indexes for comparison with the applicable standard value.

Also, the irregularity may be calculated as the product of combination of two or more of the above indexes, and this value compared with the irregularity values from the same indexes obtained at start-of-weld in a known-good pulsed arc weld. The assessment of pulsed arc start-of-weld welding stability would then be made based on the separation between these two values.

As described above, the present invention involves sensing the welding currents during the pulse period and base period at start-of-weld in pulsed arc welding; computing the irregularity of the sensed values; comparing the irregularity with the same index for a known good weld; and assessing the welding stability based on the amount of separation between the compared values. In this manner, an accurate determination as to whether the welding stability is currently good or bad can be made in real time, thus making it possible to head off defective welds before they occur. Also, the fact that the results of any actions taken to correct welding defects will be known immediately makes it easy to take immediate corrective action (such as feedback of power supply control voltages from an automatic fault recovery process) as welding anomalies are detected.

Problems, however, also occur during steady state (as opposed to start-of-weld) pulsed arc welding; i.e., unexpected events such as changes in the relative distance between the welding torch and the workpiece, sudden changes in crater shape, and changes in wire feed rate can occur. Such events can destabilize the arc phenomena, resulting in short circuit phenomena, changes in the drop-transfer state and excessive changes in arc length. They can also degrade the uniformity and esthetic appearance of the bead, making it difficult to maintain consistent weld quality.

In the past, monitoring for steady welding phenomena degradation consisted mainly of visual inspections made by production workers and technicians to check the weld bead uniformity and appearance, its shape, and the amount of spatter deposited. However, because all of these inspections were qualitative visual checks, when evaluating subtle abnormalities, individual differences were unavoidable, and this made it difficult to define uniform standards for in-line welding evaluations.

Quantitative assessment methods have been proposed, for example, as described in Japanese Laid-open Patent Bulletins No. H11-123547 (the first background art reference) and H10-314940 (the second background art reference). The first background art reference describes a method that uses a welding stability assessment index to provide a quantitative indication of arc instability phenomena that occur during steady state welding. The second background arc reference describes a monitoring method wherein the weld current, weld voltage, or both, being output by a welding power source, are measured, and the measurements within the stable region (a region that does not include unstable values measured at the pulse rise time of the pulse-welding power source) are displayed.

The method of the first background reference is intended for use with a consumable electrode gas-shielded arc welding technique in which welding is performed by repeatedly alternating between a short circuit state and an arc state. In this short circuit arc welding technique, as shown in FIG. 7, the tip of a consumable electrode (hereinafter, 'welding wire') is melted by the heat input of the arc. The molten metal is then separated from the tip of the welding wire in droplet form and short-circuit-transferred by the magnetic pinch force created by the high density current of the arc, to the workpiece, where the droplets of the short-circuit phenomenon experience a 'contact-transfer' state. Therefore, because the welding characteristic assessment index that was used as a measure of welding stability in this method is an index that has periodicity within the arc phenomenon (which is intrinsically aperiodic), it is an effective method wherein index extraction and welding assessment are easy to perform.

In pulsed arc welding, on the other hand, short circuit phenomena basically do not occur, and the welding waveform is intrinsically periodic. In the method of the first background art reference, where assessments are made using an index possessing periodicity as the measure of welding stability, the index extraction process per se is difficult, which makes it difficult to perform a quantitative assessment of arc phenomena stability. This makes the method prone to errors in the assessment of weld quality in steady state welding.

Therefore, even though the phenomena associated with weld defects are the same in both welding methods, the drop transfer modes, as described above, are completely different, and the processes that lead to defects are therefore also different. Accordingly, there was clearly no common index that could be used to assess weld stability during steady state welding in both of these welding methods.

Moreover, if the method described in Japanese Laid-open Patent Bulletin No. H11-123547 for assessing welding stability during steady state welding by the short circuit arc welding technique were to be used to perform the same assessment for pulsed arc welding, quantitative detection of instantaneous arc phenomenon instability from a periodic pulse waveform would be too difficult to enable an accurate assessment to be performed.

In the method described in the second background art reference, since assessment is performed only for measured values in the stable region, although the method is useful for determining the welding conditions (weld voltage and weld current) required to obtain a desired weld quality, it is also difficult in this method to perform quantitative assessment of arc phenomenon instability, and the method is prone to errors when assessing steady-state welding quality.

As described above, then, methods for assessing welding stability during steady-state welding by the short-circuit arc welding method cannot be used to perform similar assessments for pulsed arc welding. Therefore, for fully automatic welding lines using arc welding robots, etc., as well as for semi-automatic welding lines, the prevention of welding quality defects caused by instability of welding phenomena during steady-state welding was still a major problem.

The present invention was devised with the above problem in mind, and it is therefore a second object thereof to provide an assessment apparatus for making quick and accurate pass/fail assessments of welding stability for pulsed arc welding, by quantitatively and accurately evaluating instability phenomena that occur during steady-state welding in the consumable electrode pulsed arc welding technique.

To accomplish the above object, a welding stability assessment apparatus for pulsed-arc welding according to claim 5 of the present invention is characterized in that, in consumable electrode gas-shielded pulsed-arc welding, wherein a welding voltage is applied between a welding electrode and a workpiece to be welded, for repeatedly supplying a pulse current and a base current, in alternation, and wherein welding is performed by causing a droplet from the welding electrode to be dropped onto the workpiece for each pulse, it comprises:

a detector means for detecting at least one of
welding voltage between the welding electrode and the workpiece,
welding current flowing between the welding electrode and the workpiece, and
power-on time;
a computer means for computing the degree of irregularity of values detected by the detector means; and
an assessment means for comparing the computed irregularity with the irregularity of a known-good pulsed arc during steady state welding, and from the amount of separation therebetween, assessing the pulsed arc welding stability during steady state welding.

According to the above welding stability assessment apparatus, in order to obtain a pass/fail decision with respect to welding stability during steady state welding by the pulsed arc technique, an irregularity value computed by a computer means, based on detected values from a detector means, and pass/fail decisions are made by an assessment means, thus making it possible to perform accurate assessments of steady-state welding stability in pulsed-arc welding.

Also, a welding stability assessment apparatus for pulsed-arc welding according to claim 6 of the present invention is characterized in that the computer means computes irregularity as the product of the standard deviations of the pulse current and base current integrals for each pulse cycle.

According to this welding stability assessment apparatus, the product of the standard deviations of the pulse current and base current integrals for each pulse cycle is used as the index of welding stability during steady state welding in pulsed arc welding. This index simultaneously evaluates pulse-current/base-current uniformity and pulse-time/base-time uniformity. An index of smaller value indicates greater stability of the drop-transfer phenomenon during steady state welding by the pulsed arc method.

Also, a welding stability assessment apparatus for pulsed welding according to claim 7 of the present invention is characterized in that the computer means computes irregularity by finding the product of the standard deviations of the pulse period power-on time and base period power-on time.

According to the above welding stability assessment apparatus, the product of the standard deviations of the pulse period power-on time and base period power-on time for each pulse cycle is used as the index of welding stability during steady state welding by the pulsed arc method. This index provides an assessment of pulse time and base time uniformity. As in the above case, a lower index value indicates greater stability of the drop-transfer phenomenon during steady state welding by the pulsed arc method.

Also, a welding stability assessment apparatus for pulsed arc welding according to claim 8 of the present invention is characterized in that the computer means computes irregularity as the product of the standard deviations of the pulse voltage and base voltage integrals for each pulse cycle.

According to the above welding stability assessment apparatus, the pulse and base voltage uniformity and time uniformity can be evaluated at the same time. In particular, because the voltage waveshape changes dramatically in response to an instantaneous arc interruption, the product of these voltage integral standard deviations can be useful for assessing arc interruption defects. Smaller pulse and base voltage integral standard deviations are indicative of more stable arc phenomena.

Also, a welding assessment apparatus for pulsed welding according to claim 9 of the present invention is characterized in that the computer means computes irregularity as the ratio between the standard deviation of the integral of the pulse current for each pulse cycle, and the standard deviation of the integral of the pulse current during a known-good weld.

According to the above welding stability assessment apparatus, the ratio between the standard deviation of the integral of the pulse current for each pulse cycle and the standard deviation of the integral of the pulse current during a known-good weld is taken as the index of welding stability during steady state welding in the pulsed arc method. This index compares the drop-transfer state of the present weld with the optimum drop-transfer state, in order to evaluate the departure of the present state from the optimum. A smaller index value indicates better drop-transfer of the droplets during steady state welding in the pulsed arc welding technique.

Also, a welding stability assessment apparatus for pulsed welding according to claim 10 of the present invention is characterized in that the computer means computer irregularity as the ratio of the average value of the pulse current integral (the pulse current integral for each pulse cycle divided by the pulse period power-on time) to the average value of a known-good pulse current integral (the pulse current integral for each pulse cycle divided by the pulse period power-on time for a known good weld).

This index compares the present state of the heat input to the welding wire to the optimum heat input state, evaluates the amount of departure of the present heat input state from optimum, and provides an assessment of arc stability based on the heat input surplus/deficiency.

As discussed above, the five different indexes recited in claims 6–10 are important indicators for assessment of welding stability during steady state welding in pulsed arc welding. Therefore, it is preferable that welding stability pass/fail decisions be made by computing all five indexes and comparing each computed index against a standard value. Depending on the situation, however, welding stability pass/fail decisions may be made by computing only one or two of the above indexes, for comparison with the applicable standard values.

Also, the irregularity value may be calculated as the product of combinations of two or more of the five indexes, and this value compared with the irregularity values from the same indexes for a known-good pulsed-arc weld during steady state welding. Assessment of pulsed arc welding stability during steady state welding may then be made based on the amount of separation between the values.

As described above, the present invention involves detecting the welding current, voltage, and time during the pulse period and base period during steady state pulsed arc welding; computing the degree of irregularity of the detected values; comparing the irregularity with the same index for a known-good weld; and assessing the welding stability based on the amount of separation between the compared values. In this manner, an accurate determination as to good or bad welding stability can be made in real time, thus making it possible to head off defective welds before they occur. Also, because the results of actions taken to correct welding defects are known immediately, it is easy to take immediate corrective action (such as feedback of power supply control voltages from an automatic fault recovery process) when welding anomalies appear.

DESCRIPTION OF THE PREFERRED EMBODIMENTS

First Embodiment

As a mode for carrying out the present invention, the use of the invention for pulsed-arc MIG (metal inert gas) welding will be described. A first embodiment will be described with reference to FIGS. 1 through 7.

Figure 1:
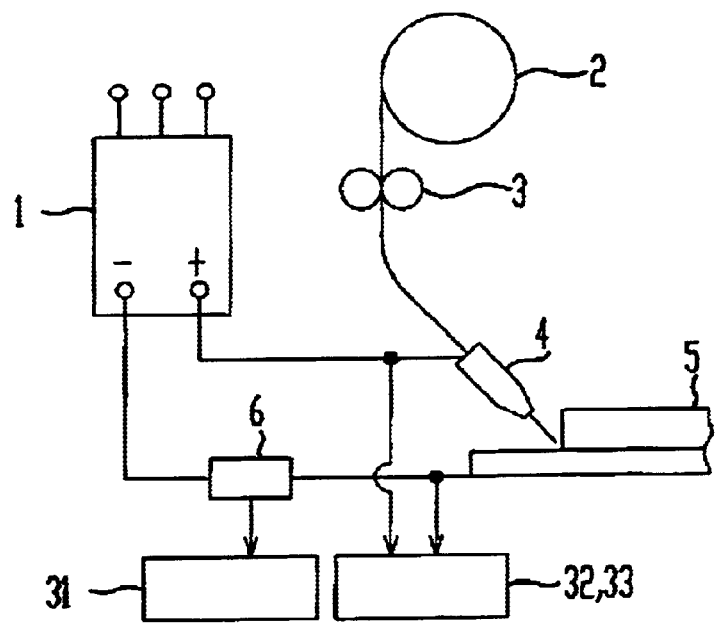
FIG. 1 is a simplified schematic diagram of a pulsed arc welding apparatus incorporating the welding stability assessment apparatus of the present invention.

FIG. 1 is simplified schematic diagram of a consumable electrode gas-shielded pulsed arc welding apparatus (hereinafter, simply 'arc welding apparatus') in one mode for carrying out the present invention. Shown in FIG. 1 are a welding power supply 1, a welding wire 2, feed rollers 3, a contact tip 4, a workpiece 5, a shunt 6 for measuring welding current, a weld current detector circuit 31, and a weld voltage detector circuit 32. Current and voltage from the welding power supply 1 are supplied such as to be applied between the welding wire 2 and the workpiece 5. Welding wire 2 is fed out at a prescribed rate by the feed rollers 3 so as to be supplied through the contact tip 4 to the workpiece 5. The ground side of the welding power supply 1 is connected to the weld current detector circuit 31 through the shunt 6, and is connected directly to the weld voltage detector circuit 32 and a power-on time detector circuit (not shown).

Figure 2:
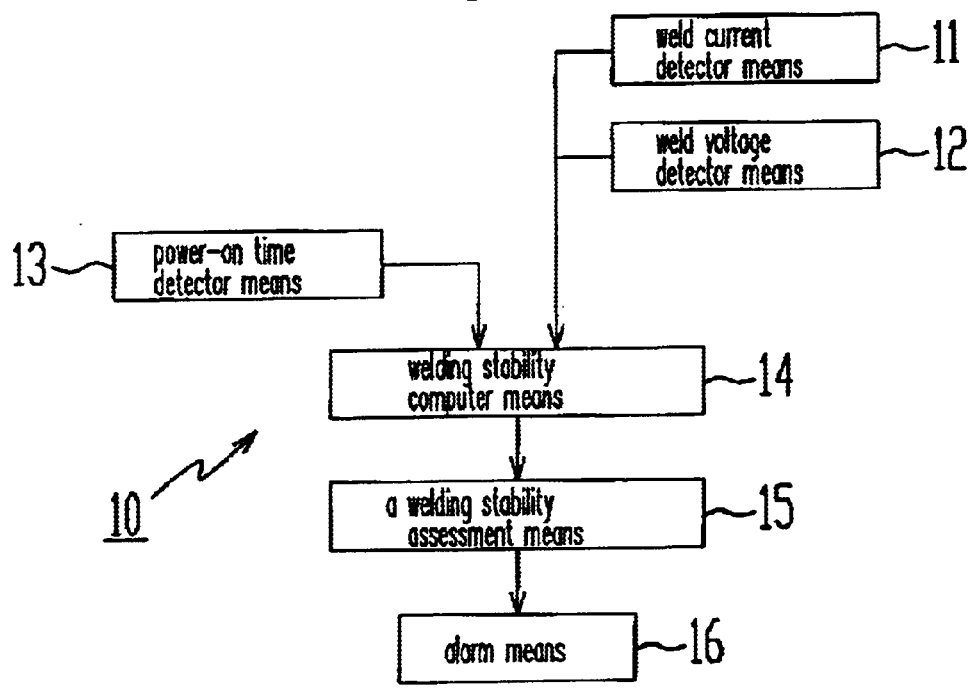
FIG. 2 is a block diagram showing the basic makeup of a welding stability assessment apparatus.

FIG. 2 is a block diagram showing the configuration of a pulsed arc welding stability assessment apparatus 10 of the present invention. The pulsed arc welding stability assessment apparatus 10 comprises a pulse period or base period weld current detector means 11, a pulse period or base period weld voltage detector means 12, a pulse period or base period power-on time detector means 13, a welding stability computer means 14, a welding stability assessment means 15, and an alarm means 16. Based on detection values detected by the three detection means 11, 12, and 13, the welding stability computer means 14 computes irregularity values separately for each detection value. The welding stability assessment means 15 then performs a comparison between these presently computed irregularity values and the same kind of irregularity values detected at the start-of-weld in a known-good pulsed arc weld. An overall assessment of start-of-weld pulsed arc welding stability is then made from the amount of separation of the presently detected irregularity values from the known-good irregularity values. If the overall separation exceeds a reference standard value, a 'not stable' decision is made, and an alarm is issued by the alarm means 16.

Figure 3:
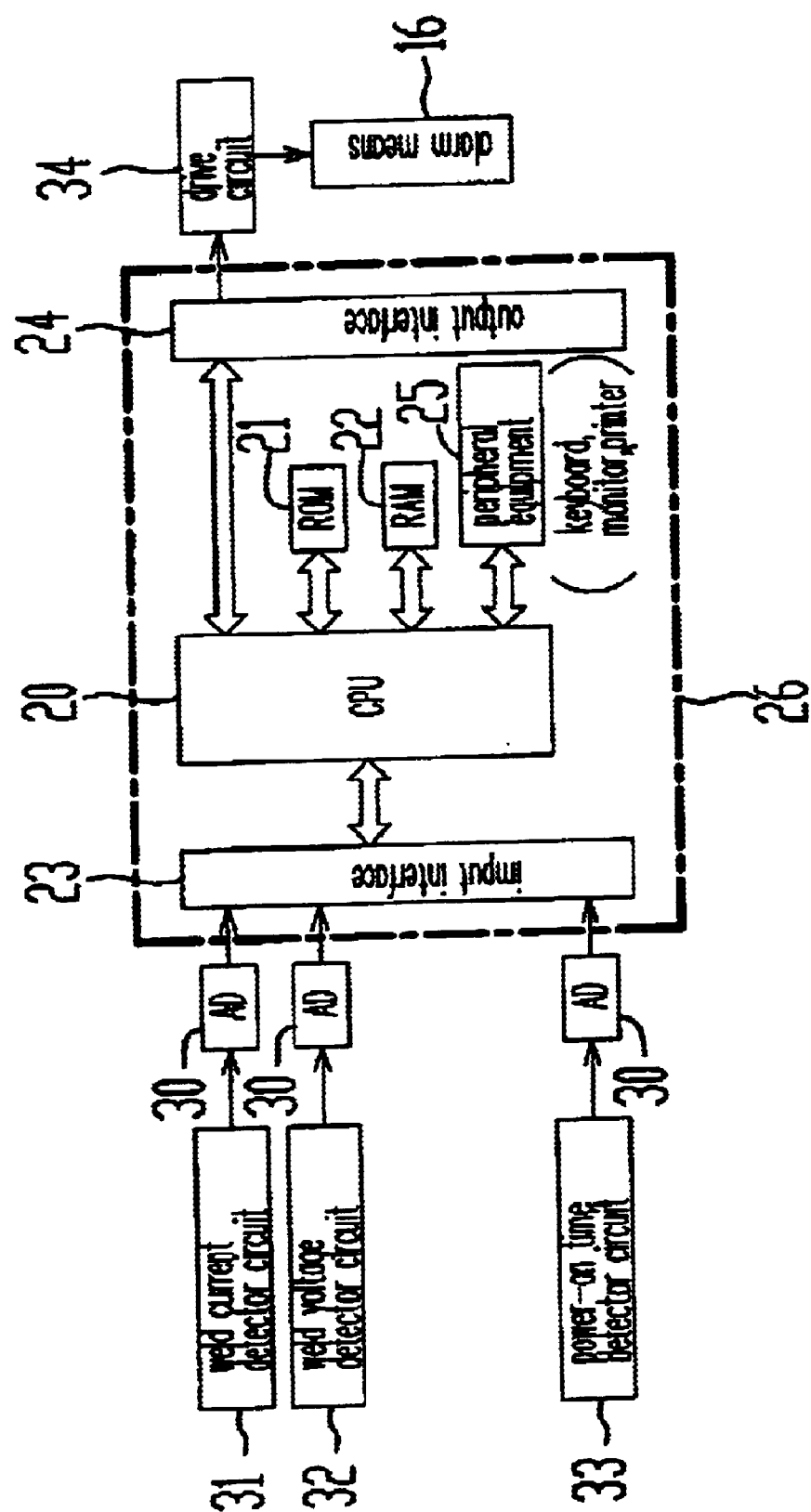
FIG. 3 is a block diagram showing the basic circuit configuration of a welding stability assessment apparatus.

Next, the basic circuit of the pulsed arc welding stability assessment apparatus 10 will be described, based on the block diagram of FIG. 3. A controller 26, as shown in FIG. 3, contains a processing unit 20 (CPU), a memory 21 (ROM), a memory 22 (RAM), an input interface 23, an output interface 24, and peripheral equipment 25 (keyboard, monitor, printer, etc.). Also shown are A/D converters (signal converter means) 30, the welding current detector circuit 31, the welding voltage detector circuit 32, the power-on time detector circuit 33, and a drive circuit 34 for driving the alarm means 16.

Stored in the memory 21 (ROM) are programs (assessment programs) provided with various processes (included in flow charts to be discussed later), for assessing welding characteristics, so that the proper assessment programs can be executed during operation of the processing unit 20 (CPU). Memory 22 (RAM) is for temporary storage of data variables required for execution of the assessment programs.

The outputs of the detector circuits 31–33 pass through the A/D converters 30 to the input interface 23, to be input to the processing unit 20 (CPU). Irregularity values computed by the processing unit 20 (CPU) for welding current, welding voltage and power-on time are each compared against their respective reference standard values. If they fail to match, the drive circuit 34 is activated through the output interface 24, to drive the alarm means 16, which issues an alarm.

Figure 4:
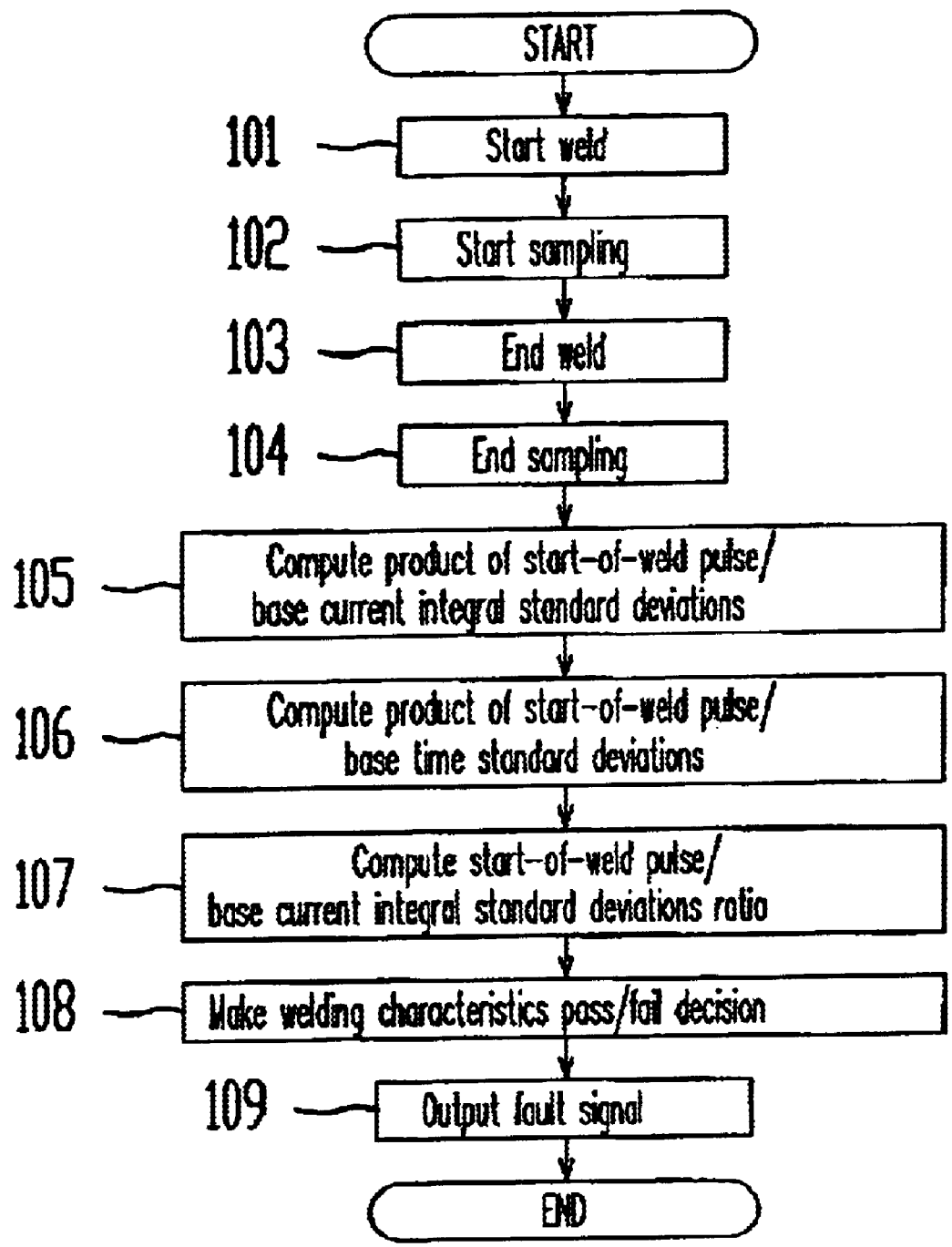
FIG. 4 is a simplified flow chart of an assessment program.
Figure 5:
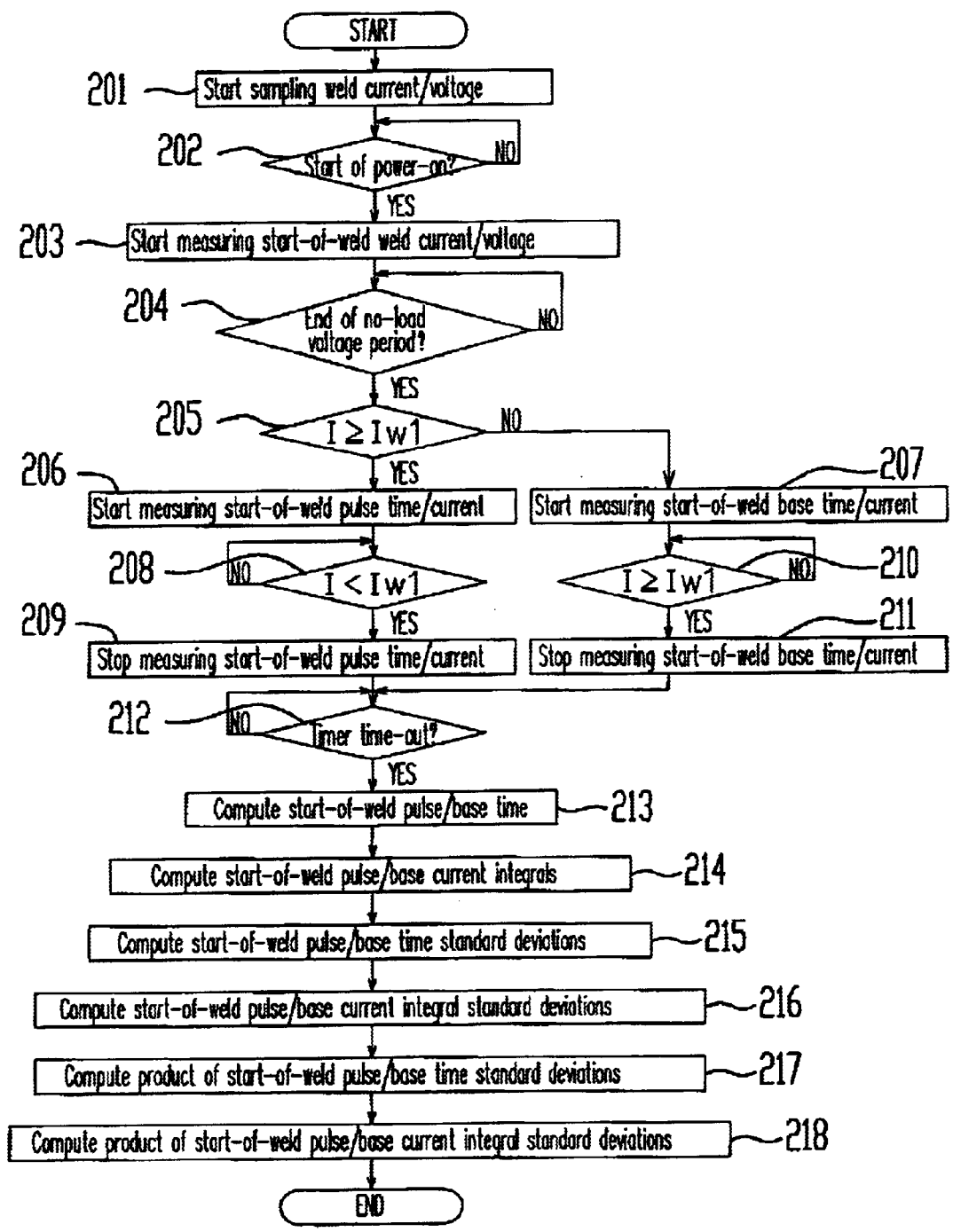
FIG. 5 is a detailed flow chart of an assessment program.
Figure 6:
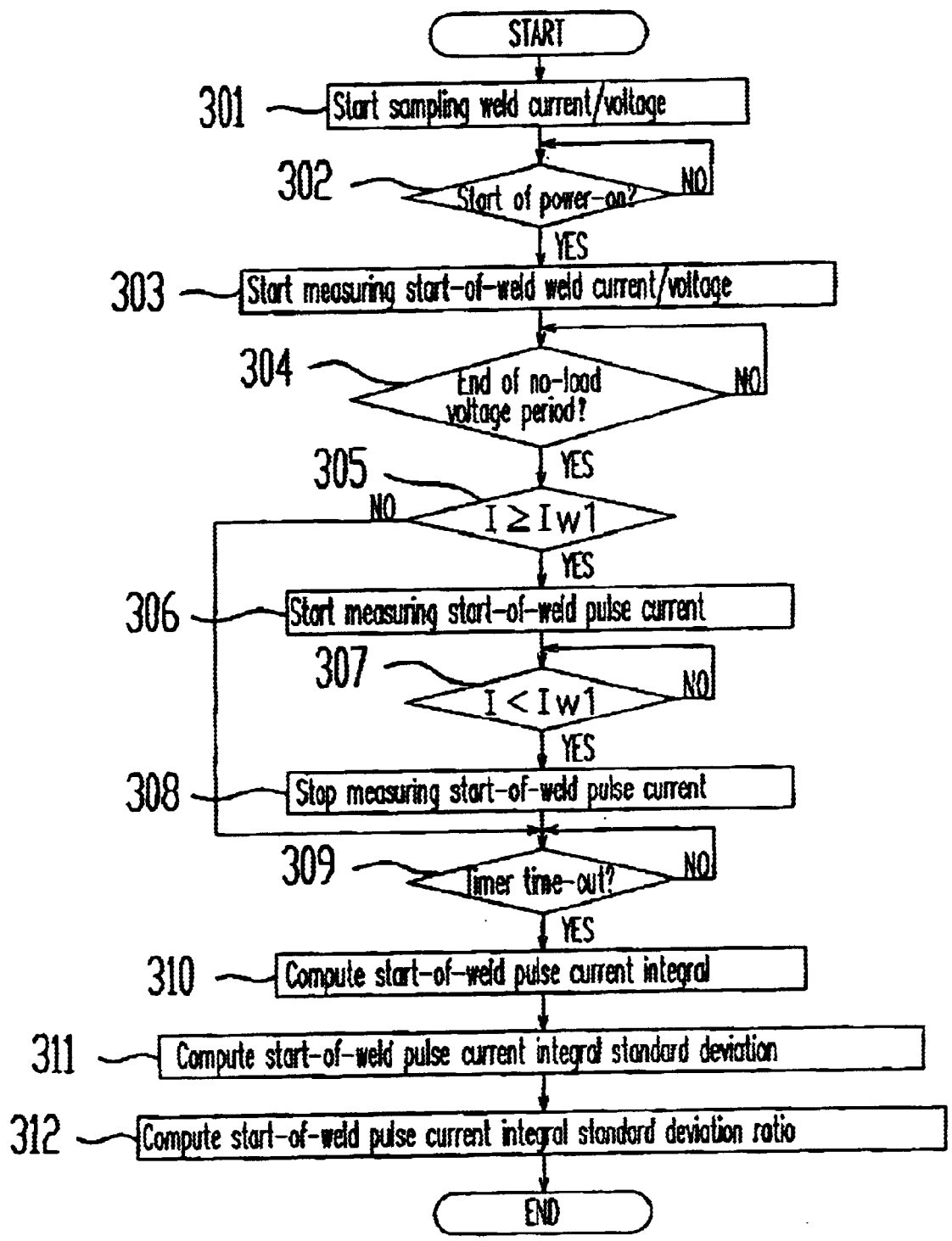
FIG. 6 is a detailed flow chart of an assessment program.
Figure 7:
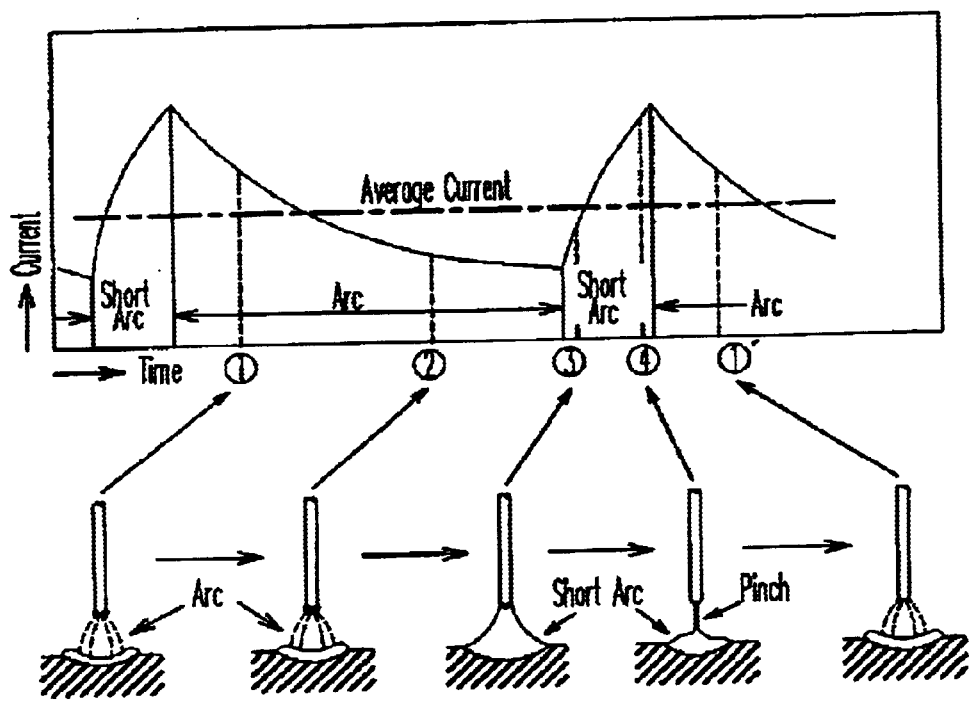
FIG. 7 shows known drop-transfer states in the short-circuit arc welding method.
Figure 8:
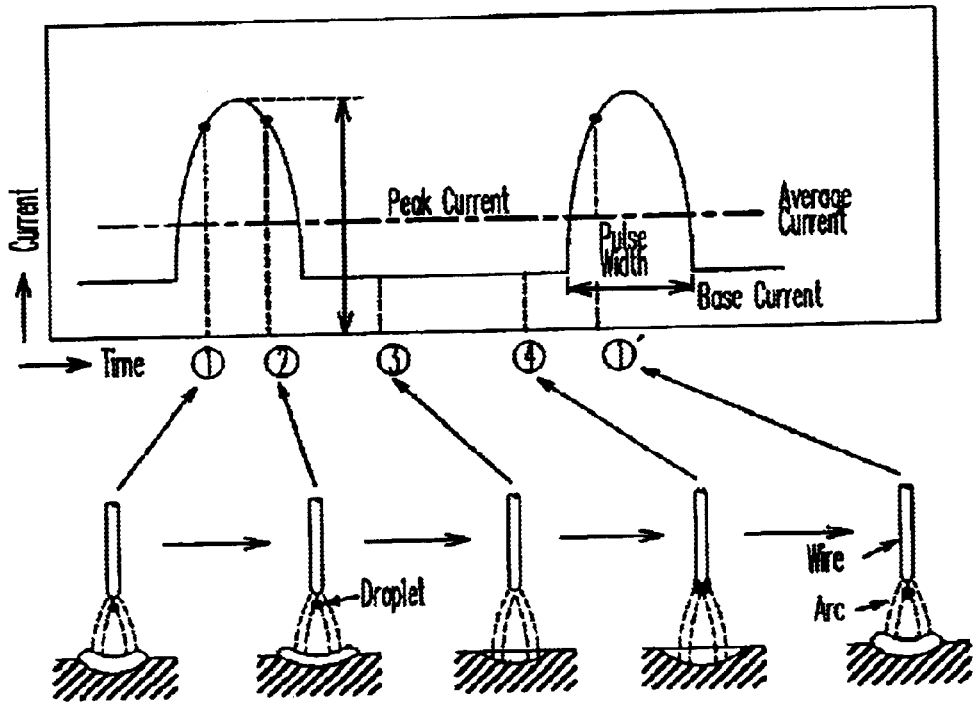
FIG. 8 shows known drop-transfer states in the pulsed arc welding method.

Next, processes for assessing welding characteristics will be described based on the flow charts of FIGS. 4–6. A simplified flow is shown in FIG. 4, and more detailed flows are shown in FIG. 5 and FIG. 6. As mentioned above, assessment programs for executing the processes shown in the flow charts are stored in the memory 21 (ROM) of FIG. 3. As will be understood from FIG. 4, a sampling process is initiated by starting a weld (Steps 101 and 102) and ends when the weld is ended (Steps 103 and 104). Then, each of the following are computed, in sequence, as indexes of welding stability irregularity at start-of-weld: (1) the product of the standard deviations the integrals of pulse current and base current, (2) the product of the standard deviations of pulse time and base time, and (3) the ratio between the standard deviations of the pulse current and base current (Steps 105–107). These indexes are compared with the same indexes for a known-good welding operation, and a welding characteristic pass/fail determination is made based on the amount of separation between the present values and the known-good values (Step 108). If the amount of separation exceeds a reference standard value, a fault signal is output (Step 109).

Next, the process flow from the start of sampling through the calculation of the product of the pulse and base current integral standard deviations, and product of the pulse and base time standard deviations will be described with reference to FIG. 5. As indicated in the previously referred to FIG. 9, the product of the standard deviations of the pulse current and base current integrals may be expressed as $\sigma(\int I_{P(n)}dt) \times \sigma(\int I_{B(n)}dt)$, and the product of the standard deviations of the pulse and base time as $\sigma T_{P(n)} \times \sigma T_{B(n)}$. As shown in FIG. 5, the program first starts sampling weld current and weld voltage (Step 201), and then checks for the start of power-on (Step 202). When power-on is detected, measurement of start-of-weld-period weld voltage and weld current begins (Step 203).

Figure 9:
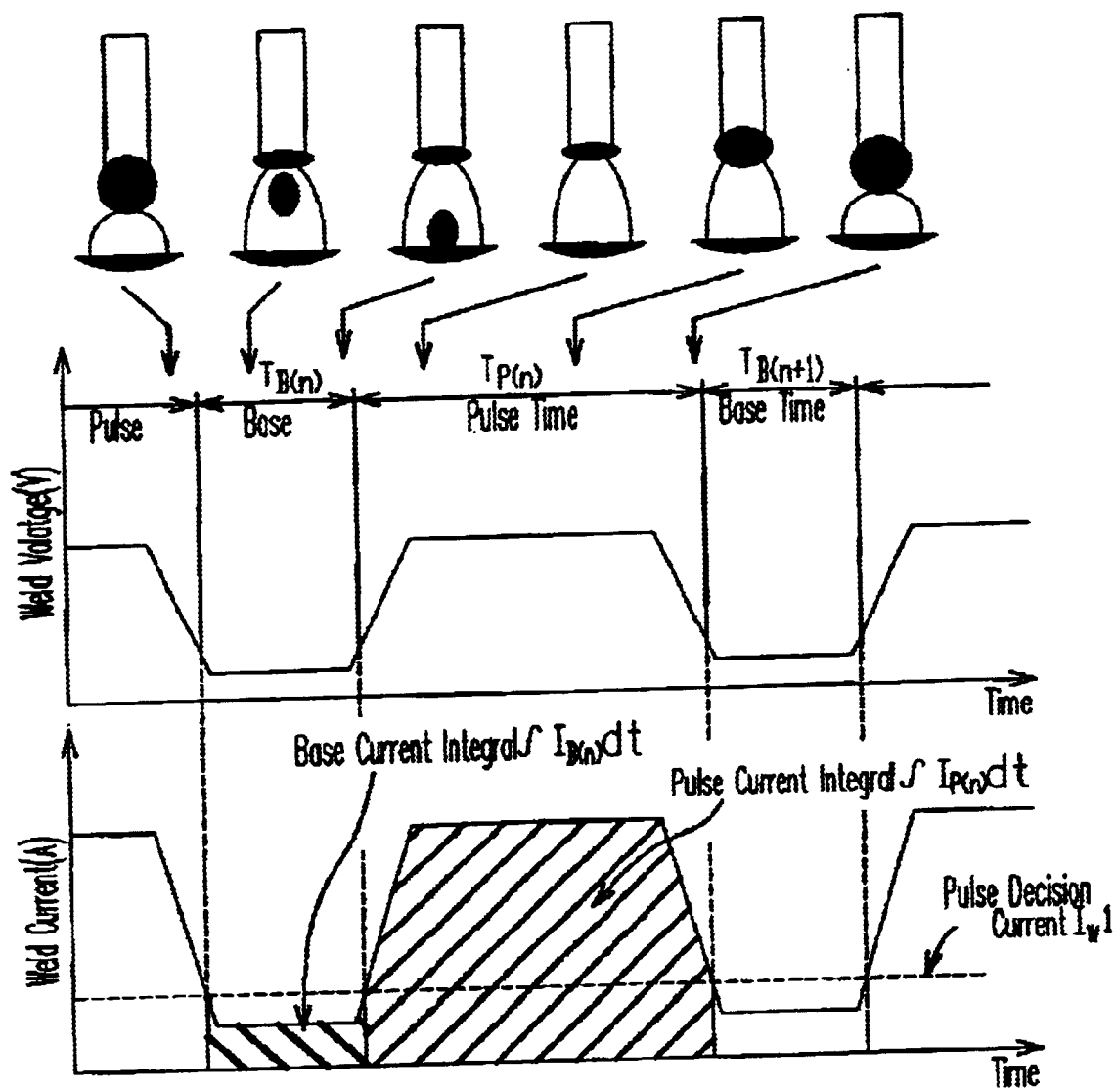
FIG. 9 shows relationships between pulsed-arc drop-transfer states and welding voltage and current.

After Step 203, program execution waits for the end of a no-load voltage time (Step 204), then it determines (Step 205) whether the weld current is equal to or greater than a pulse decision current value $I_{W1}$ (FIG. 9). If that condition is met, measurement of pulse weld current and pulse time is started (Step 206). If, however, the weld current in Step 205 is less than $I_{W1}$, the measurement of base weld current and base time begins (Step 207). In Step 208, the program checks whether the weld current is less than the pulse current decision value $I_{W1}$, and if it is, stops measurement of pulse weld current and pulse power-on time (Step 209). In Step 210, the checks whether the pulse weld current exceeds the pulse decision current level $I_{W1}$. If this condition is satisfied, measurement of base welding current and base time is ended (Step 211).

At step 212, execution waits for a timer to time-out; after which it computes the start-of-weld-time pulse current integral, pulse time, base current integral, and base time (Steps 213 and 214). Next, the program computes the standard deviations of the pulse current integral and base current integral, and the standard deviations of the pulse time and base time (Steps 215 and 216), and goes on to compute the products of the respective standard deviations (Step 217 and 218).

FIG. 6 shows the flow for the portion of the process that deals with the pulse current integral standard deviation ratio $(\sigma(\int I_{P(n)}dt)/S)$. First, the program starts sampling weld voltage and weld current (Step 301), while checking for the start of power-on (Step 302). Once power-on is detected, the program starts measuring start-of-weld-period weld voltage and weld current (Step 303) while checking for the end of the no-load voltage time (Step 304). When the no-load voltage time ends, the program checks to see if the weld current is at or above the pulse decision current $I_{W1}$ (Step 305). When this condition is satisfied, the program starts measuring the pulse weld current and pulse power-on time (Step 306), while checking to see if that current is less than the pulse decision current $I_{W1}$ (Step 307). When that condition is met, the program ends the measurement of pulse weld current and pulse power-on time (Step 308). After waiting for a timer time-out (Step 309), the program computes the integral of the pulse current over the start-of-weld time (Step 310) and the standard deviation of that pulse current integral (Step 311). It then divides this pulse current integral standard deviation by the pulse current integral standard deviation for welding performed at the proper voltage, S: $\sigma(\int I_{P(n)}dt)$, to thus complete the computation of the pulse current integral standard deviation ratio (Step 312).

To make pass/fail decisions on welding stability, the values of various important characteristics computed as outlined above are each compared to a reference standard value for that characteristic. If a 'fail' decision is made, an alarm is set as described above. When this occurs, operation of the welding line is immediately stopped to prevent welding defects from being passed along to downstream processes. The welding equipment is then checked to isolate fault locations, and make corrections. When this has been accomplished, the welding line is started up again.

The foregoing describes a preferred embodiment of the present invention. The present invention, however, is not confined to this embodiment, and a variety of modifications are possible. For example, the indexes of welding stability irregularity presented in the above embodiment as indexes to be compared against were (1) the product of the standard deviations the integrals of pulse current and base current, (2) the product of the standard deviations of pulse and base time, and (3) the ratio between the standard deviation of the pulse current integral, and the same standard deviation for a known-good welding operation. It is possible, however, to compute indexes other than the three mentioned above as indicators of irregularity. For example, the product (pulse current integral standard deviation)×(base current integral standard deviation)×(pulse period power-on time standard deviation)×(base period power-on time standard deviation) could also be used as an irregularity index.

Second Embodiment

Figure 10:
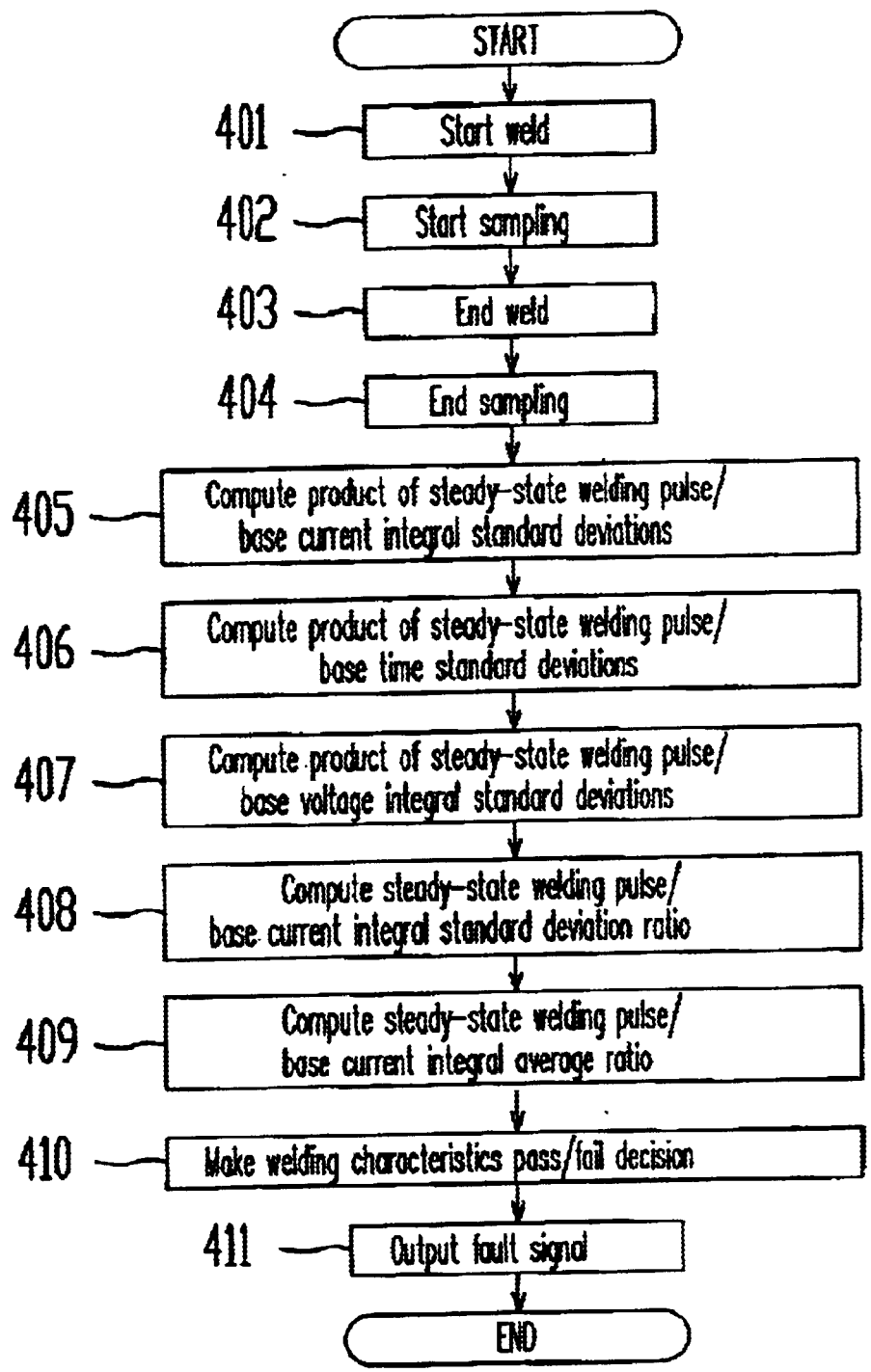
FIG. 10 is a simplified flow chart of an assessment program.
Figure 11:
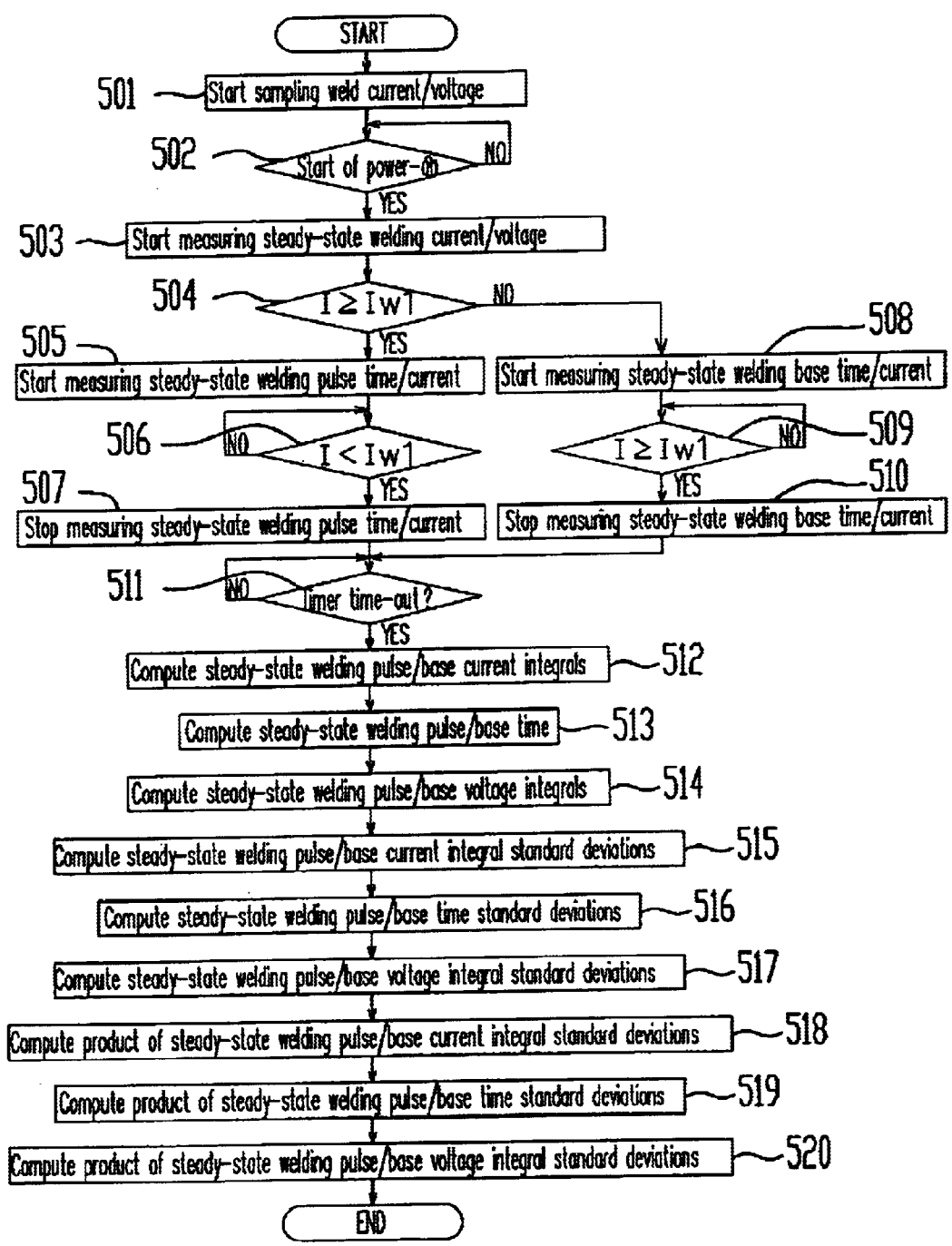
FIG. 11 is a detailed flow chart of an assessment program.
Figure 12:
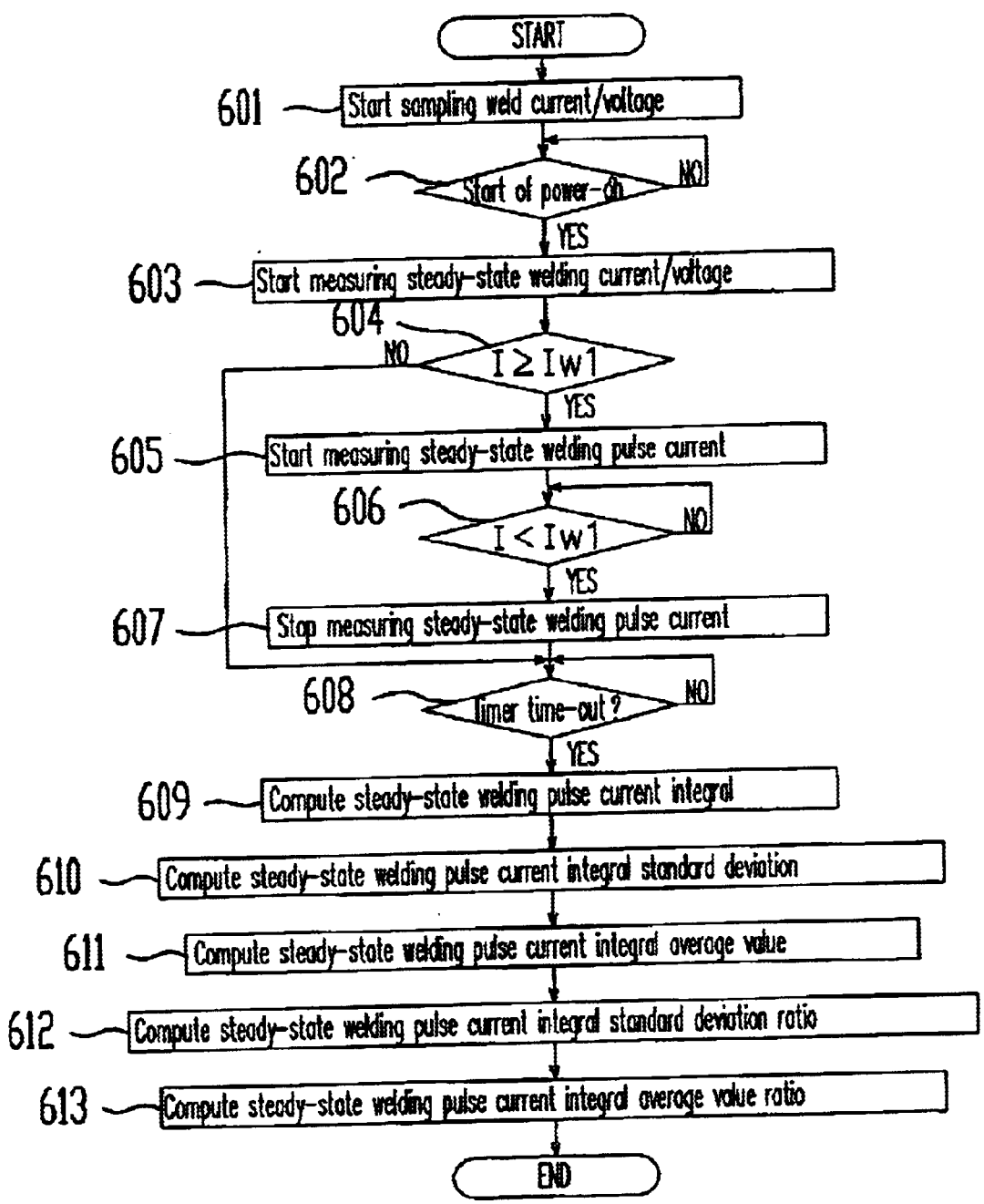
FIG. 12 is a detailed flow chart of an assessment program.

Next, assessment of welding characteristics during steady-state welding will be described based on the flow charts of FIGS. 10–12. FIG. 10 is a simplified flow chart, and FIGS. 11 and 12 show more detail. As previously mentioned, the assessment program that executes the processes represented by these flow charts is stored in the memory 21 (ROM) of FIG. 3. As will be understood from FIG. 10, a sampling process is initiated by starting a weld (Steps 401 and 402) and ends when the weld is ended (Steps 403 and 404). Then, each of the following are computed, in sequence, as indexes of welding stability irregularity during steady-state welding: (1) the product of the standard deviations of the integrals of pulse current and base current, (2) the product of the standard deviations of pulse and base time, (3) the product of the standard deviations of the pulse and base voltage integrals, (4) the ratio between the standard deviations of the pulse and base current integrals, and (5) the ratio between the average values of the pulse and base current integrals (Steps 405–109). These indexes are compared with the same indexes for a known-good welding operation, and a welding characteristics pass/fail determination is made based on the amount of separation between the computed index values and the known-good index values (Step 410). If the amount of separation exceeds a reference standard value, a fault condition signal is output (Step 411).

Next, the process flow from the start of sampling through the calculation of the product of the standard deviations of the pulse and base current integrals, the product of the standard deviations of the pulse and base time, and the product of the standard deviations of the pulse and base voltage integrals will be described with reference to FIG. 11. As indicated in the previously referred to FIG. 13, the product of the standard deviations of the pulse current and base current integrals can be expressed as $\sigma(\int I_{P(n)}dt) \times \sigma(\int I_{B(n)}dt)$, the product of the standard deviations of the pulse and base time can be expressed as $\sigma T_{P(n)} \times \sigma T_{B(n)}$, and the product of the standard deviations of the pulse voltage and base voltage integrals can be expressed as $\sigma(\int V_{P(n)}dt) \times \sigma(\int V_{B(n)}dt)$. As shown in FIG. 11, the program first starts sampling weld current and weld voltage (Step 501), and then checks for the start of power-on (Step 502). When power-on is detected, measurement of weld voltage and weld current during steady state welding begins (Step 503).

Figure 13:
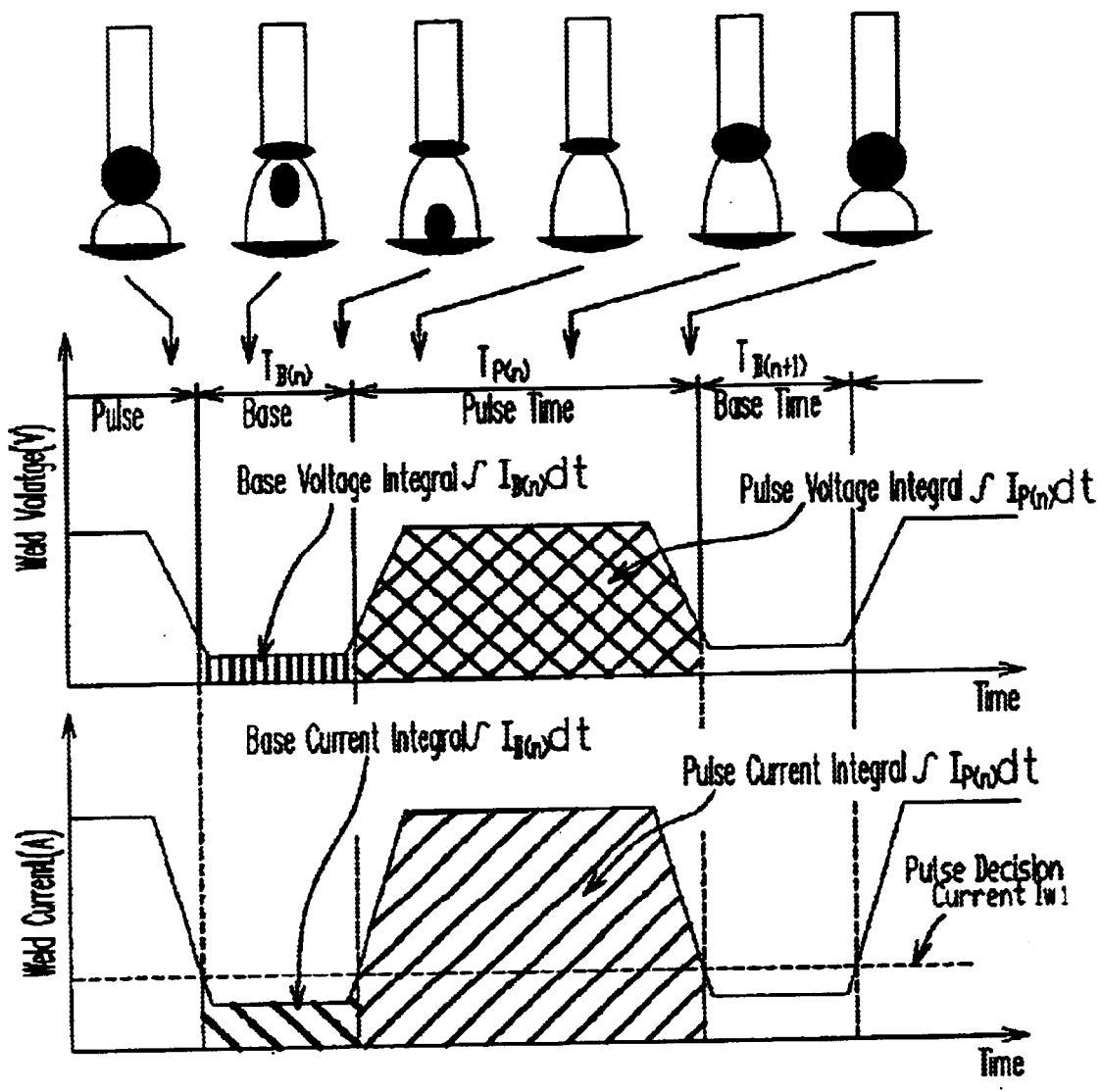
FIG. 13 shows relationships between pulsed-arc drop-transfer states and welding voltage and current.

Next, in Step 504, the program checks whether the weld current equals or exceeds the pulse decision current value $I_{W1}$ (FIG. 13). If that condition is met, measurement of pulse weld current, pulse weld voltage, and pulse time is started (Step 505). If, however, the weld current in Step 504 is less than $I_{W1}$, the measurement of base weld current, base weld voltage, and base time is started (Step 508). In Step 506, the program checks to see if the weld current is less than the pulse current decision value $I_{W1}$, and if it is, ends measurement of pulse weld current, pulse weld voltage, and pulse time (Step 507). In Step 509, the program checks to see if the pulse current exceeds the pulse decision current level $I_{W1}$. If that condition is satisfied, measurement of base welding current, base welding voltage, and base time is ended (Step 510).

At step 511, execution waits for a timer to time-out, after which is computes the integrals of the pulse current and voltage, the pulse time, the integrals of the base current and voltage, and base time during steady state welding (Steps 512, 513 and 514). Next, the program computes the standard deviations of the pulse current integral, the pulse voltage integral, and the pulse time, and the standard deviations of the base current integral, the base voltage integral, and the base time (Steps 515, 516 and 517), and goes on to compute the products of the respective standard deviations (Steps 518, 519 and 520).

FIG. 12 is the flow for computing the pulse current integral standard deviation ratio $(\sigma(\int I_{P(n)}dt)/S_n)$ and the pulse current integral average ratio $(Ave (\int I_{P(n)}dt)/S_{ave})$. First, the program starts sampling weld current and weld voltage (Step 601) while checking for the start of power-on (Step 602). Once power-on is detected, the program starts measuring weld voltage and weld current during steady state welding (Step 603). Next, the program checks to see if the weld current is at or above the pulse decision current $I_{W1}$ level (Step 604). When this condition is satisfied, the program starts measuring the pulse welding current and pulse power-on time (Step 605), while checking to see if that current is less than the pulse decision current $I_{W1}$ (Step 606). When that condition is met, the program ends measurement of pulse weld current and pulse time (Step 607). After waiting for a timer time-out (Step 608), the program computes the pulse current integrals during steady welding (Step 609), and the standard deviation and average value of those pulse current integrals (Steps 610 and 611), and then divides this pulse current integral standard deviation by S: $\sigma(\int I_{P(n)}dt)$ (the standard deviation of the integral of the pulse weld current for a weld performed at the optimum voltage), to complete the pulse current integral standard deviation ratio computation (Step 612). Division by $S_{Ave}$: $Ave(\int I_{P(n)}dt)$ (the optimum pulse current integral average value) is also performed, to compute a pulse current integral average value ratio (Step 613).

To make welding stability pass/fail decisions, the values of various important characteristics computed as outlined above are each compared to a reference standard value for that characteristic, and if a 'fail' decision is made, an alarm is set off as described above. When this occurs, operation of the welding line is immediately stopped to prevent welding defects from being passed to processes further downstream. The welding equipment is then checked to isolate fault locations, and make corrections. When this process is complete, the welding line is started up again.

The foregoing describes a preferred embodiment of the present invention. The present invention is not confined to this embodiment, however, and a variety of modifications are possible. For example, the indexes of welding stability irregularity presented in the above embodiment as indexes to be compared against a standard, were (1) the product of the standard deviations the integrals of pulse current and base current, (2) the product of the standard deviations of pulse and base time, (3) the product of the standard deviations of the pulse voltage integral and base voltage integral, (4) the ratio between the standard deviation of the pulse current integral and the same standard deviation for a known good weld, and (5) the ratio between the pulse current integral average value and the same average value for a known good weld. It would be possible, however, to compute indexes other than the five mentioned above as indicators of irregularity. For example, the product of (pulse current integral standard deviation)×(base current integral standard deviation)×(pulse power-on time standard deviation)×(base power-on time standard deviation) could also be used as an irregularity index.

The claimed invention is:

1. A welding stability apparatus for pulsed-arc welding, characterized in that, in consumable electrode gas-shielded pulsed-arc welding, wherein a welding voltage is applied between a welding electrode and a workpiece to be welded, for repeatedly supplying a pulse current and a base current, in alternation, and wherein welding is effected by causing a droplet from the welding electrode to be dropped onto the workpiece for each pulse, it comprises:
    a detector means for detecting at least one of
        welding voltage between the welding electrode and the workpiece,
        welding current flowing between the welding electrode and the workpiece, and
        power-on time;
    a computer means for computing degree of irregularity of values detected by the detector means; and
    an assessment means for comparing the computed irregularity with the irregularity of a known-good pulsed arc at the start of welding, and, from the amount of separation therebetween, assessing the pulsed arc welding stability at the start of welding.

2. A welding stability assessment apparatus for pulsed-arc welding as recited in claim 1, characterized in that the computer means computes irregularity as the product of the standard deviations of the integrals of the pulse current and base current over each pulse cycle.

3. A welding stability assessment apparatus for pulsed-arc welding as recited in claim 1, characterized in that the computer means computes irregularity as the product of the standard deviations of a pulse period power-on time and a base period power-on time for each pulse cycle.

4. A welding stability assessment apparatus for pulsed-arc welding as recited in claim 1, characterized in that the computer means computes irregularity as the ratio between the standard deviation of the integral of the pulse current for each pulse and the standard deviation of the integral of the pulse current for a known good weld.

5. A welding stability assessment apparatus for pulsed-arc welding, characterized in that, in consumable electrode gas-shielded welding, wherein a welding voltage is applied between a welding electrode and a workpiece to be welded, for repeatedly supplying a pulse current and a base current, in alternation, and wherein welding is performed by causing a droplet from the welding electrode to be dropped onto the workpiece for each pulse, it comprises:
    a detector means for detecting at least one of
        welding voltage between the welding electrode and the workpiece,
        welding current flowing between the welding electrode and the workpiece, and
        power-on time;
    a computer means for computing the degree of irregularity of values detected by the detector means; and
    an assessment means for comparing the computed irregularity with the irregularity of a known-good pulsed arc during steady state welding, and from the separation therebetween, assessing the pulsed arc welding stability during steady state welding.

6. A welding stability assessment apparatus for pulsed-arc welding as recited in claim 5, characterized in that the computer means computer irregularity by finding the product of the standard deviations of the pulse current integral and base current integral for each pulse cycle.

7. A welding stability assessment apparatus for pulsed-arc welding as recited in claim 5, characterized in that the computer means computes irregularity by finding the product of the standard deviations of the pulse period power-on time and base period power-on time.

8. A welding stability assessment apparatus for pulsed-arc welding according to claim 5, characterized in that the computer means computes irregularity as the product of the standard deviation of the integral of the pulse voltage and the standard deviation of the base voltage for each cycle.

9. A welding stability assessment apparatus for pulsed-arc welding as recited in claim 5, characterized in that the computer means computes irregularity as the ratio between the standard deviation of the integral of the pulse current for each pulse cycle, and the standard deviation of the integral of the pulse current during a known-good weld.

10. A welding stability assessment apparatus for pulsed-arc welding as recited in claim 5, characterized in that the computer means computes irregularity as the ratio between the average value of the pulse current integral: the pulse current integral for each pulse cycle divided by the pulse period power-on time; and the average value of a known-good pulse current integral: the pulse current integral for each pulse cycle divided by the pulse period power-on time for a known good weld.

* * * * *